United States Patent [19]

Clay

[11] Patent Number: 4,607,436

[45] Date of Patent: Aug. 26, 1986

[54] AUTOMOBILE TIRE-SPANNING BEAM OUTSIDE CALIPERS

[76] Inventor: Truman R. Clay, 7631 Coal Creek Pkwy. Southeast, Renton, Wash. 98056

[21] Appl. No.: 576,185

[22] Filed: Feb. 2, 1984

[51] Int. Cl.$^4$ .............................................. G01B 5/08
[52] U.S. Cl. ................................. 33/143 D; 33/1 D; 33/487
[58] Field of Search ............... 33/1 D, 143 D, 143 J, 33/143 I, 487

[56] References Cited

U.S. PATENT DOCUMENTS

| | | | |
|---|---|---|---|
| 297,056 | 4/1884 | Bellows | 33/143 J |
| 2,841,874 | 7/1958 | Richardson | 33/143 D |
| 2,874,478 | 2/1959 | Faulconer | 33/143 M |
| 3,200,501 | 8/1965 | Keszler | 33/143 J |

Primary Examiner—William D. Martin, Jr.
Attorney, Agent, or Firm—Robert W. Beach; Ward Brown

[57] ABSTRACT

A beam has a slide carrying one arm of calipers to be applied diametrically to an automotive vehicle tire. Indicating means for the calipers includes a beam scale of buttress configuration and an index carried by the slide cooperating with inclined portions of the buttress scale and graduated in decimals or fractions of a unit of the beam scale.

5 Claims, 6 Drawing Figures

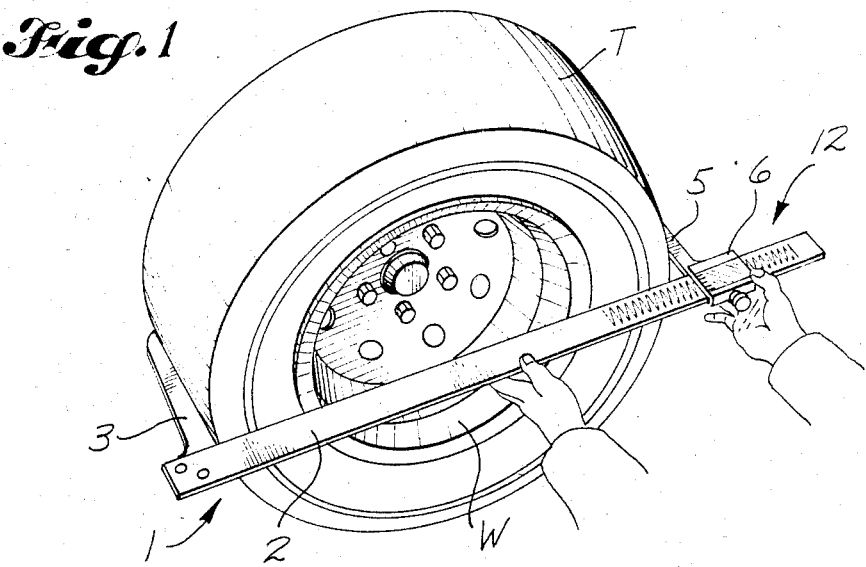
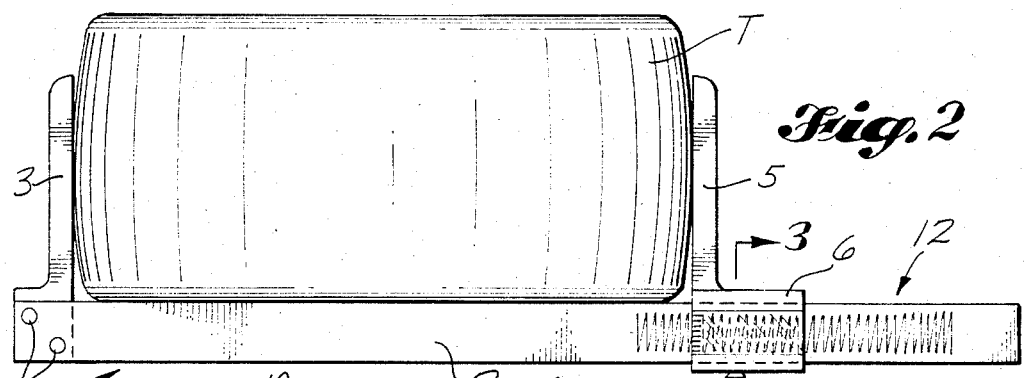
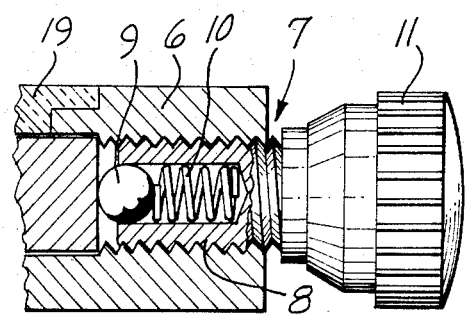
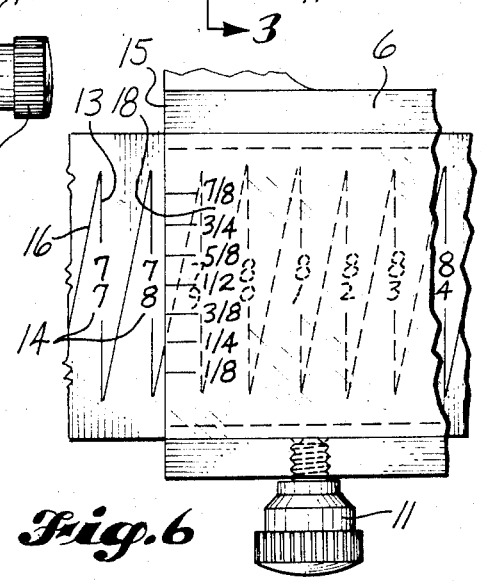

AUTOMOBILE TIRE-SPANNING BEAM OUTSIDE CALIPERS

BACKGROUND OF THE INVENTION

Field of the Invention

This invention relates to beam outside calipers for spanning the diameter of an automotive vehicle tire which are graduated to indicate the circumference of the tire.

Performance Problem

The performance of a racing automobile is influenced by the relative outer circumferential size of its tires. Automobile racing may be conducted on a closed race course having parallel straightaways the corresponding ends of which are joined by course end curves.

In closed course racing it is usually desirable to obtain as high speed as possible on the straightaways and slow the speed as may be necessary to navigate the track end curves. If all of the tires of a racing automobile are of the same size, the automobile tends to maintain a straight course along the straightaways, but it is difficult to change such straight course to a curved course corresponding to the curvature of a track end.

On the other hand, if the tires of a racing automobile on the inside of a curve are smaller than the tires of the automobile on the outer side of the curve, the automobile will tend to hold the curved course. If the differential between the size of the tires on the inner side of the curve and on the outer side of the curve is properly selected with relation to the sharpness of the curve, the automobile will hold the curved course with little or no steering effort. An automobile having such tires of differential size in a straightaway will, however, tend to swerve toward the inside of the track instead of tending to maintain a straight course so that it will be necessary for the driver to exert a steering effort to hold the automobile in a straight course. Such steering effort will be greater for greater automobile speeds and for a larger tire size differential.

Because of the foregoing course-holding capability of a racing automobile along a straightaway and in a curve, it is customary practice for the tires used on the wheels of a racing automobile on the inner side of the course to be somewhat smaller than the tires of the automobile on the outer side of the course. The amount of differential in size will depend upon the particular race course, the length of its straightaways and the sharpness of curvature of its ends, and also will depend upon the individual preference of the particular racing driver.

Also it is important to be able to select precise tire sizes for automobiles used for drag racing and for road racing.

Another factor in selecting the size of tires for a automotive vehicle is the fact that the maximum circumferential extent of a tire is influenced by the degree of tire inflation, and the degree of tire inflation is dependent both upon the initial air pressure in the tire and the amount of heat generated by travel of the vehicle which heats the air in the tire and consequently increases its pressure.

Tire Size Measurement Problem

For the reasons discussed above, it is important to be able to measure the circumference of tires accurately as a guide to selecting tires. Because of the time constraints of automobile racing, it is also desirable to be able to measure the size of tires quickly, particularly if it is necessary to change tires during a race. It is not acceptable simply to select a tire indicated to be of a particular size designation, because the wear on a tire will change its circumference. Also different tires may expand at different rates for the same increase in temperature resulting from being heated by travel. The size of tires is measured immediately after test racing as well as when cold. Consequently, it has been customary heretofore to measure the actual circumference of each tire and then to relate the measured circumferences of tires on the wheels to be on the inside of the race course to the measured circumference of the tires to be on the outer side of the race course.

Prior Art

In order to measure the circumference of a racing automobile tire it has been the practice to apply a tape measure around the circumference of each tire. If the tire was mounted on an automobile wheel supporting an automobile, it was therefore necessary to jack up such wheel until the tire was clear of the ground in order to make such a measurement.

A difficulty with actually measuring the circumference of an automobile tire mounted on an automobile wheel, whether or not that wheel is supporting an automobile, is that the tire usually is crowned to a greater or lesser extent and the measurement made will vary depending upon whether the tape measure encircles the tire precisely in registration with the tire crown throughout the circumference of the tire, or whether a portion or all of the tape measure is located at one side or the other of the crown. To locate the tape measure precisely on the crown is more difficult if the tire is mounted on a wheel that is attached to an automobile, even if such wheel is jacked up. On most race cars there is not enough room between the body and the tire to see the tape.

Another disadvantage to the customary procedure for measuring the circumference of a tire mounted on a jacked-up automobile wheel is that it is more difficult to place the tape measure properly all around the tire, it is generally more awkward to wrap the tape measure around the wheel, it is harder to locate the tape measure precisely on the crown of the tire and the tendency of the wheel to rotate about its axis and to swivel on its axle or spindle generally complicate the measuring manipulation. The tires become very hot when raced (approximately 180° F.). They collect debris when the automobile comes into the pits. This debris must be cleaned off before the tire can be measured with a tape measure.

SUMMARY OF THE INVENTION

It is a principal object of the present invention to be able to ascertain the circumference of an automotive vehicle tire mounted on a wheel that is supporting the vehicle, instead of measuring the circumference of such a wheel when it is jacked up off the ground.

Another object is to be able to ascertain the circumference of such a tire quickly, easily and accurately.

It is also an object to be able to ascertain the circumference of a tire on a wheel supporting an automotive vehicle by use of an instrument which is easy and quick to manipulate and read, and which can be used to ascertain the circumference of tires within a considerable size range.

More specifically, it is an object to ascertain the circumference of a tire on a wheel supporting an automotive vehicle by gauging the diameter of the tire rather than by directly taping its circumference.

The foregoing objects can be accomplished by gauging the tire with beam outside calipers provided with a scale calibrated in units of tire circumference rather than in units of tire diameter.

BRIEF DESCRIPTION OF THE DRAWINGS

FIG. 1 is a top perspective of an automobile wheel showing the tire-spanning beam outside calipers of the present invention in top perspective applied to a tire on a wheel.

FIG. 2 is a top plan of an automobile tire with the calipers shown in a side view applied to the tire.

FIG. 3 is a detail section through a portion of the calipers taken along line 3—3 of FIG. 2, and FIG. 4 is a further enlarged fragmentary section of a portion of FIG. 3.

FIG. 6 is a similar view of calipers having a scale of a different type and with further parts broken away.

DETAILED DESCRIPTION

Figure 5:
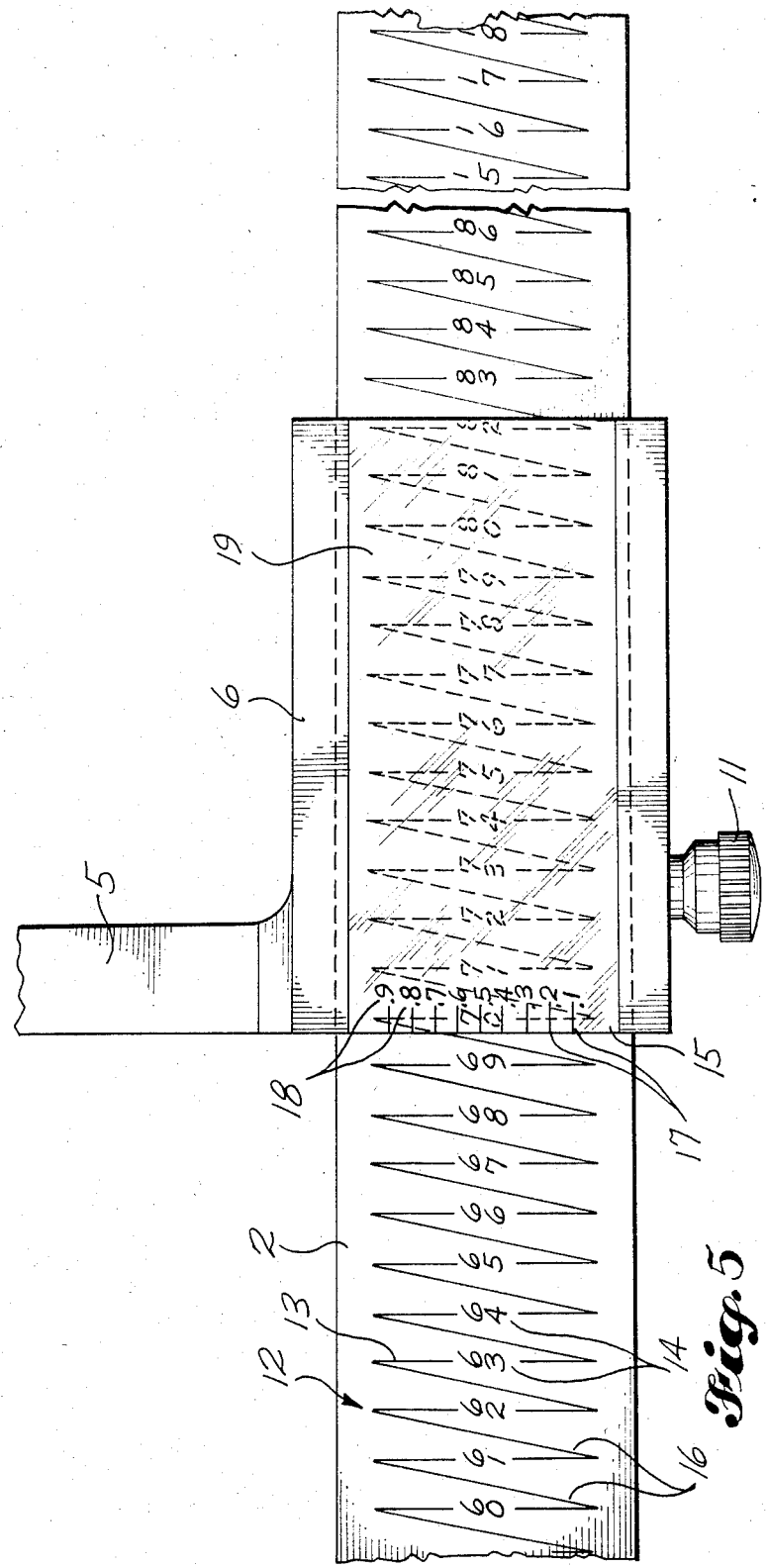
FIG. 5 is an enlarged side view of a portion of the calipers shown in FIG. 2 bearing an indicating scale of one type.

In applying the beam outside calipers of the present invention to the tire T of an automobile or another automotive vehicle for ascertaining its circumference, it is important that the tire be mounted on a wheel W, but it is immaterial whether that wheel is in turn mounted on an automobile. The tire should be mounted on a wheel, however, because it is desired to ascertain the circumference of the tire when it is inflated to the desired degree, and such inflation can only be accomplished when the tire is mounted on a wheel.

Although, as stated, it is not necessary for the wheel W to be mounted on an automobile in order to ascertain it circumference by applying to it the beam outside calipers of the present invention, such calipers can be applied to the tire almost as readily when the wheel is mounted on the automobile and is supporting the automobile as when the wheel is unmounted.

The beam outside calipers indicated generally at 1 are composed of a beam 2 of rectangular cross section and of a length substantially greater than the diameter of any tire the circumference of which is to be ascertained by use of the calipers. An arm 3 is secured by screws 4 to one end portion of the beam 2 extending perpendicularly from one side of it and of a length at least as great as one half the width of the widest tire to which the calipers are to be applied. Another arm 5 projecting perpendicularly from the same side of the beam 2 is carried by a slide 6 slidably mounted on the beam 2 for shifting the arm 5 toward and away from the arm 3. Arm 3 and arm 5 projecting from the slide 6 are parallel and both arms are perpendicular to the length of beam 2. The beam should be of a sufficient width in a direction parallel to arms 3 and 5 so that these arms cannot be cocked relative to each other when the caliper arms are slid tightly against diametrically opposite portions of the tire in a direction axially of the tire.

Normally, in applying the calipers to a tire the arms 3 and 5 will not be forced against the circumference of the tire. On the contrary, it is preferable that the arms 3 and 5 initially be spaced apart a distance somewhat greater than the diameter of the tire. The calipers are then moved loosely axially of the wheel to span the tire, and the beam 2 is moved lengthwise to draw the arm 3 against one peripheral portion of the tire. Slide 6 is then shifted along the beam until arm 5 contacts the portion of the tire circumference diametrically opposite that portion engaged by arm 3. The beam 2 can then be swung slightly about arm 3 as a center to move arm 5 circumferentially of the tire until it is in a position spaced as far as possible from arm 3 while still contacting the circumference of the tire during such swinging movement.

When the position of slide 6 along beam 2 has been established by such manipulation of the calipers, the slide is secured in such adjusted position by setting screw ball clamp 7. As shown in FIG. 4, such screw ball clamp includes the screw 8 threaded into a tapped hole in the slide 6. Such screw has in it a blind bore receiving presser ball 9 and helical compression spring 10 backing such ball. The screw can be rotated relative to slide 6 in its tapped bore by turning knob 11 carried by the outer end of the screw. As the knob is rotated to screw screw 8 inward, ball 9 will be pressed resiliently more firmly against the edge of beam 2 to press such beam in turn edgewise against the opposite side of the passage through slide 6.

The position of slide 6 along beam 2 will correspond to the length of the diameter of the tire T extending between the portions of the tire circumference engaged by arms 3 and 5. Such diameter will be located at the crown of the tire because of the perpendicular relationship of arms 3 and 5 to the beam 2 and their parallel relationship to each other. The maximum diameter of the tire bears a fixed relationship to the maximum circumference of the tire, the length of such circumference being $\pi$ times as great as the diameter of the tire, i.e. 3.14159265 times as great as such diameter. It is preferred to ascertain the dimensions of the tire in terms of its circumference rather than its diameter, because racing automobile drivers are accustomed to calculate the relationship of sizes of tires at different locations on the automobile in terms of circumference rather than in terms of diameter.

In order to enable the user of the calipers to ascertain the maximum circumference of the tire to which the calipers have been applied in the manner described above, a scale 12 is provided for indicating the tire circumference corresponding to the position of slide 6 along beam 2. As shown in FIGS. 5 and 6, the scale 12 is of buttress configuration, including parallel intercepts 13 extending perpendicular to the length of the beam 2 and parallel to arms 3 and 5, which are spaced apart distances corresponding to one-inch increments in the circumference of the tire. Consequently such intercepts are actually spaced apart 7/22 of an inch, or 0.318 of an inch (0.81 cm.). Each of these intercepts bears a number 14, indicating such circumference of the tire in whole inches. In FIG. 5 the slide 6 is positioned on beam 2 to indicate that the circumference of the tire is greater than 69 inches and less than 70 inches, while in FIG. 6 the slide is positioned on the beam to indicate that the tire circumference is greater than 78 inches but less than 79 inches.

Most racing drivers are not satisfied to be able to ascertain the circumference of a tire within a tolerance of one inch. While the edge or line index 15 of the slide 6 could be used to indicate approximately what portion of an inch exceeding the numeral adjacent to such edge is included in the circumference of the tire, it is preferred that a much more precise indication of circumference be readily ascertainable. For this purpose the parallel intercepts 13 are all made of the same length and one end of each intercept is connected to the opposite end of the adjacent intercept by an inclined intercept 16, so that the scale on the beam 2 is of buttress configuration. Because intercepts 13 are of equal lengths, intercepts 16 also will be of equal lengths and will be parallel.

The index edge 15 of slide 6 will intersect the inclined intercept 16 joining the parallel intercepts 13 at opposite sides of the index edge at a location proportionate to the spacing between such edge and the adjacent intercept 13 parallel to it that is not covered by the slide. Such proportion can be ascertained by graduations 17 arranged along the index edge 15. In FIG. 5 such graduations are designated by decimals of an inch 18, whereas in FIG. 6 such graduations are designated by fractions of an inch 18'. The appropriate decimal or fraction of an inch indicated by the graduation mark closest to the intersection of the index edge 15 with the inclined intercept 16 which it crosses will indicate the proportion of an inch in addition to the full inch of the adjacent intercept 13 that is included in the circumference of the tire for the position of slide 6 along beam 2. Thus, in FIG. 5 the circumference of the tire is indicated as being 69.7 inches, and in FIG. 6 the circumference of the tire is indicated as being 78¼ inches.

While the scales of FIGS. 5 and 6 are indicated as being calibrated in inches, the scale on the beam 2 could be designed to provide an indication of the circumference of a tire in metric units of measurement.

By the use of the beam outside calipers described above, the circumference of a wheel-mounted automotive vehicle tire, whether or not the wheel is on and supporting the vehicle, can be ascertained very quickly and conveniently. If the wheel W on which the tire T is mounted is supporting an automotive vehicle, it will be convenient for the user of the caliper to apply it to the tire with the beam 2 in substantially horizontal position as shown in FIG. 1. With the clamp 7 released, the calipers are applied with the arms 3 and 5 fitting opposite sides of the tire circumference loosely. The slide 6 can then be moved along the beam 2 until the arms 3 and 5 contact diametrically opposite portions of the tire. With the slide held in such position along the beam, knob 11 is turned to set the clamp 7 to fix slide 6 in position on beam 2. The calipers can then be removed from the tire.

By observing the position of slide index edge 15 relative to the adjacent intercept 13, the whole number of inches of the tire circumference will be known. The user can then read the additional portion of an inch, if any, in the tire circumference by noting the graduation 18 or 18' along index edge 15 that coincides with the intersection of such edge with the inclined intercept 16 which it crosses.

If desired, the side of slide 6 covering the side of beam 2 bearing the tire circumference scale indicia can be made transparent by providing for such side of the slide a transparent panel 19. Such panel is preferably made of transparent plastic.

I claim:

1. Automotive vehicle tire-spanning outside calipers comprising opposed tire-contacting members for engagement with diametrically opposite portions of a tire, joining means connecting said tire-contacting members and guiding said tire-contacting members for relative movement toward and away from each other, and scale means and index means movable relative to each other in synchronism with movement of said tire-contacting members relative to each other, said scale means including a scale line elongated transversely of but inclined relative to the direction of relative movement of said scale means and said index means, and said index means including a line extending transversely of the direction of relative movement of said scale means and said index means and disposed for crossing said inclined scale line a predetermined spacing of said tire-contacting members.

2. The calipers defined in claim 1, the joining means including a beam for spanning the diameter of the automotive vehicle tire, the scale means being carried by said beam, one tire-contacting member including an arm projecting laterally from one side of said beam, the other tire-contacting member including a second arm, and the joining means further including a slide slidable along said beam lengthwise thereof and carrying said second arm projecting laterally from the same side of said beam, the index means being carried by said slide for cooperation with said scale means on said beam.

3. The calipers defined in claim 2, in which the beam is straight, the scale line is inclined at a small angle to a line perpendicular to the length of the beam, and the index means includes a line extending perpendicular to the length of the beam for crossing the inclined scale line.

4. The calipers defined in claim 2, in which the scale means includes a series of parallel lines spaced lengthwise of the beam and inclined relative to the length of the beam, and the index means includes a line extending perpendicular to the length of the beam for crossing the inclined scale lines in different positions of the slide along the beam.

5. The calipers defined in claim 4, in which the scale means on the beam is of buttress formation, including parallel inclined lines and lines perpendicular to the length of the beam and disposed respectively between and connecting adjacent inclined lines.

* * * * *

UNITED STATES PATENT AND TRADEMARK OFFICE
CERTIFICATE OF CORRECTION

PATENT NO. : 4,607,436
DATED : August 26, 1986
INVENTOR(S) : Clay, Truman R.

It is certified that error appears in the above-identified patent and that said Letters Patent are hereby corrected as shown below:

The title of the application should read:

...AUTOMOTIVE VEHICLE TIRE-SPANNING BEAM OUTSIDE CALIPERS...

Signed and Sealed this

Twenty-eighth Day of October, 1986

[SEAL]

Attest:

DONALD J. QUIGG

*Attesting Officer*     *Commissioner of Patents and Trademarks*